United States Patent [19]

Bugg, Sr. et al.

[11] 3,790,708

[45] Feb. 5, 1974

[54] COMMUNICATION METHOD AND APPARATUS

[75] Inventors: Vernon M. Bugg, Sr., Churchville; Francis V. Bugg, Towson, both of Md.

[73] Assignee: Telectrotype Corporation of America, Belair, Md.

[22] Filed: Oct. 12, 1972

[21] Appl. No.: 296,838

[52] U.S. Cl. ................ 178/17 C, 178/23, 178/26 R
[51] Int. Cl. ......................... H04l 15/06, H04l 15/34
[58] Field of Search 178/17 R, 17 A, 17 C, 23, 26 R

[56] References Cited

UNITED STATES PATENTS

| | | | |
|---|---|---|---|
| 1,562,457 | 11/1925 | Kleber | 178/26 R |
| 2,113,611 | 4/1938 | Bugge | 178/23 R |

*Primary Examiner*—William C. Cooper
*Assistant Examiner*—Gerald Brigance
*Attorney, Agent, or Firm*—Wilkinson, Mawhinney & Theibault

[57] ABSTRACT

The present disclosure is directed to a communication system employing two typewriters of the electromechanical type each of which is equipped to be both a transmitter and receiver for two-way communication. When employed as a transmitter the first typewriter, upon depression of each keyboard device, initiates an electrical pulse which is passed through an encoding matrix which is responsive and definitive of only one keyboard character and which through a recycling chain counter places the representative pulse, having its identity discernable by its polarity, current or frequency level, on the conductive link between the first and second typewriter. At the second typewriter the incoming signal is received through an electrically selective matrix of switching devices which decode the incoming signal by polarity, current level or frequency. The pulse format is then directed to a second matrix where electrical means responsive to the individual coded characters activate the print out mechanism of the second typewriter to print the message.

5 Claims, 7 Drawing Figures

COMMUNICATION METHOD AND APPARATUS

This invention relates to a method and apparatus for a communication system applied to printing telegraph systems of the non-synchronous type.

There are two general representative systems of printing telegraphy in existance, one depending upon the maintenance of synchronism between transmitting and receiving units, and the other depending upon the characteristic sequence of impulses forming signals to which a receiving unit coherently reacts. It is to the latter class of system which the present invention relates.

The present invention is in the form of a capability expansion and substantial improvement over the systems described in U.S. Pat. No. 2,111,138 of Mar. 15, 1938, and U.S. Pat. No. 2,113,611 of Apr. 12, 1938.

An object of the present invention is to provide a novel and improved electrical code transmitting and receiving system which is adaptable to existing electromechanical typewriters with only modification to keyboard apparatus to effect generation of electrical impulse, and modification, as may be necessary, to print upon reception of an electrical impulse.

Another object of the invention is to provide a method and means for encoding, transmitting and receiving data without the necessity of the manufacture of specialty mechanical linkages, gear, code wheels, brushes, etc., as predominate in the aforementioned patents and present day telegraphic apparatus.

Another object of the invention, is an improvement over the aforementioned patents, by the addition of a numerical encoding and handling capability to the total data handling capability.

Another object of the invention is to provide a system having fewer moving parts, within the framework of that mechanism necessary to the transmitting, receiving and grading of data, than the aforementioned patent systems, in order to gain a greater measure of mechanical reliability and reduce breakdown potential.

Another object of the invention is to provide an encoding format that presents a greater opportunity for code transmission reliability as opposed to those existing code formats characterized by definite time intervals in a code string and the maintenance of synchronism between receiver and transmitter.

Another object of the invention, by way, again, of improvement over the aforementioned patents, is to provide for increasing the margin of operation of devices responsive to impulse characteristics. In the aforementioned patents, an arrangement of armatures and brushes and components associated with detent step type relays were employed. In the present invention an automatically re-cycling chain counter is employed (hereinafter described as the four-level discriminator matrix). Automatic return-to-zero (R.T.Z.) is an inherent function of this matrix, which returns the receiver portion of the system to a quiescent state armed to receive, grade, and print the next incoming string of encoded data.

With the foregoing and other objects in view the invention will be more fully described hereinafter and more particularly pointed out in the appended claims.

In the drawings in which like parts are denoted by reference characters throughout the several views.

Figure 1:
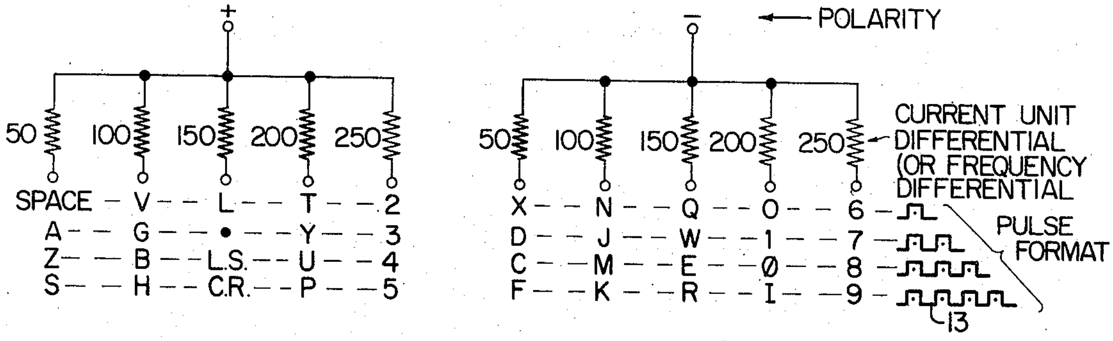
FIG. 1 is a diagrammatic schematic of the encoding format by character current or frequency value and polarity.
Figure 4:
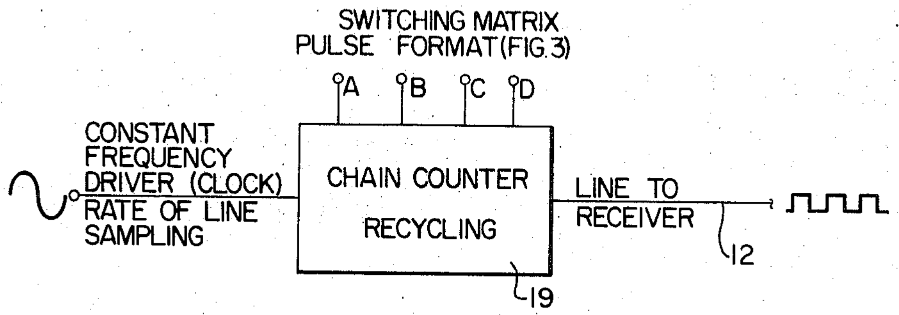
FIG. 4 is a circuit schematic of the re-cycling chain counter with a return to zero function.
Figure 2:
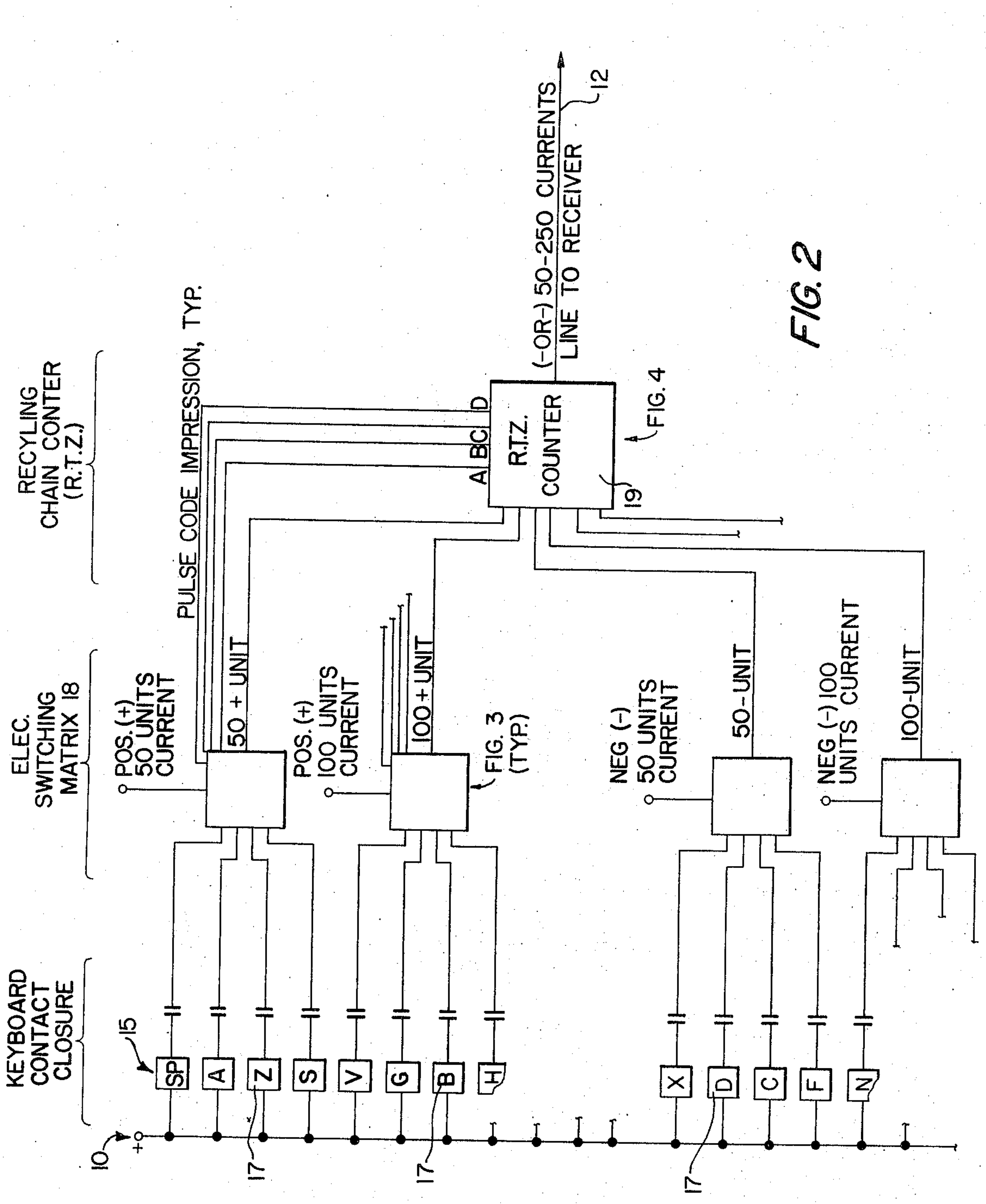
FIG. 2 is a diagrammatic schematic of the transmitter unit associated with each typewriter.

Referring now to the drawings, FIGS. 2 and 4, the present invention comprises a transmitting unit 10 and a receiving unit 11 linked by electrically conductive means 12. The transmitting unit 10 initiates character signals 13, FIG. 1, consisting of discrete combinations of electrical pulses having different current or frequency levels and polarity in such combinations as to furnish each character on the typewriter keyboard with an electrical identity of its own. The receiving unit 11 includes electrical and electromechanical means 14 capable of reacting coherently to the signal combinations generated by the transmitter 10.

Figure 3:
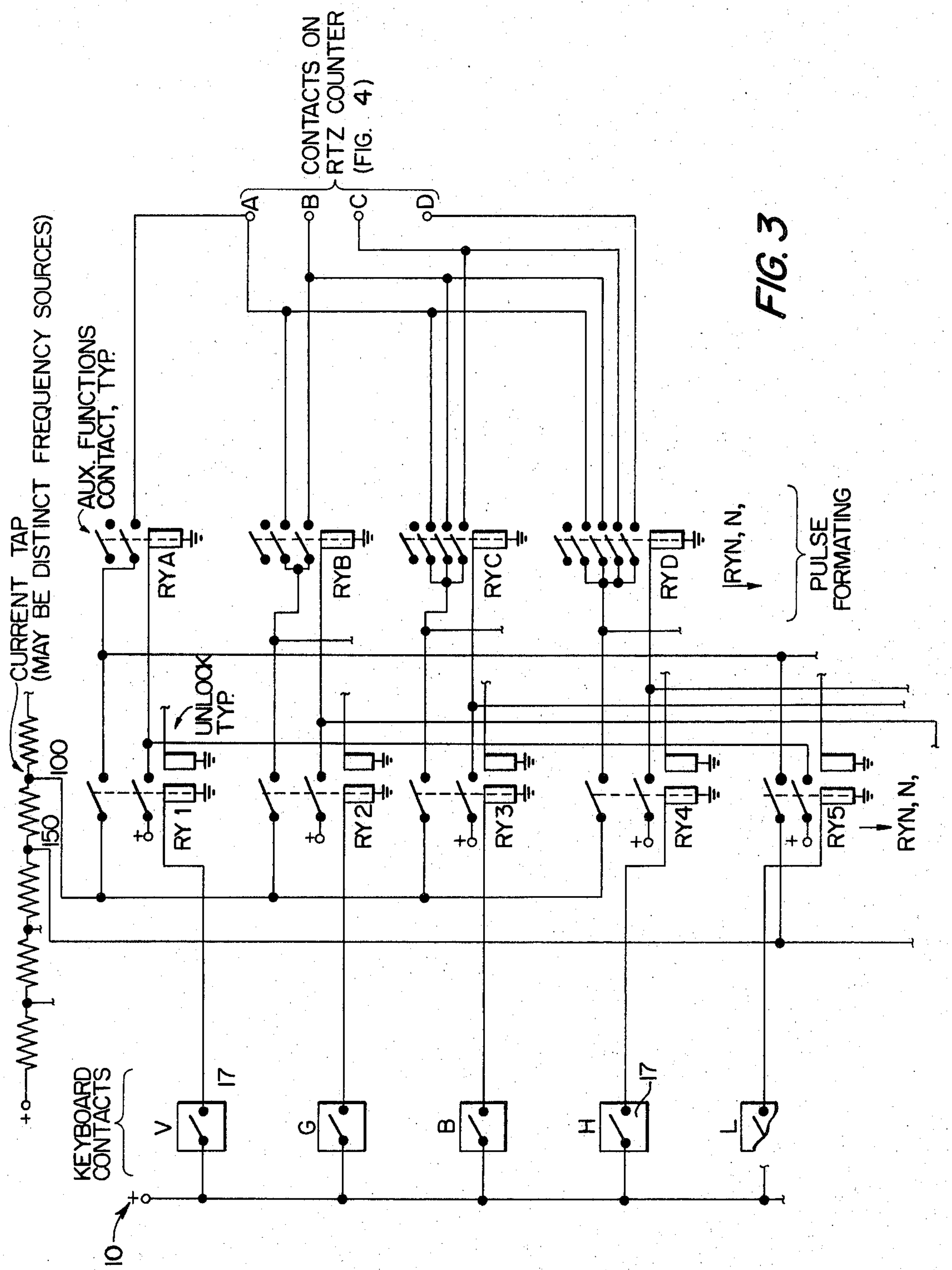
FIG. 3 is a circuit schematic of the electrical switching matrix employed with the transmitter.

The transmitting unit 10, being a conventional electromechanical typewriter has a keyboard 15 and printing mechanism 16. This does not exclude those typewriter mechanisms which may be modified to create closure of electrical contacts upon keyboard operation. Responsive to the depression of each keyboard device 17 is the initiation of an electrical impulse 13, FIGS. 1, 2 and 3. The electrical output of each contact 17 is conducted to an electrical switching matrix 18, each unit within the matrix being responsive only to one character key initiated at the keyboard 15. Within each element of the matrix 18 is included means for impressing upon the line 12 the appropriate polarity, current or frequency level to define a pulse format, FIG. 1, representative of the character selected to be transmitted. Sequentially, with the code format now being determined, a re-cycling chain counter 19, FIGS. 4 and 6, with a return-to-zero (R.T.Z.) function, places the formatted data on the conductive link 12 with the receiver 11.

The chain counter 19 performs a continuous sequential sampling of format lines A, B, C, D to obtain a sequential impression of active lines on conductive link 12 to the receiver 11. The rate of the sampling cycle is governed by a clock frequency input and the response rate of the receiver. The counter 19 of FIG. 4 connects with the right hand end of FIGS. 2 and 3.

The receiver 11 comprises, as a basic structure, a keyboard and printing mechanism which may be any one of the conventionally marketed electromechanical teletypewriters and/or typewriters having electrically actuated or aided printing mechanism. Affixed to this basic structure as a sub-assembly, and being electrically connected to the conductive link 12 with the transmitter unit 10, is an electrically selective matrix of switching devices 18 which are responsive to polarity and to specific levels of current or frequency. This matrix serves as a screening means to analyze incoming polarity and current levels.

Figure 5:
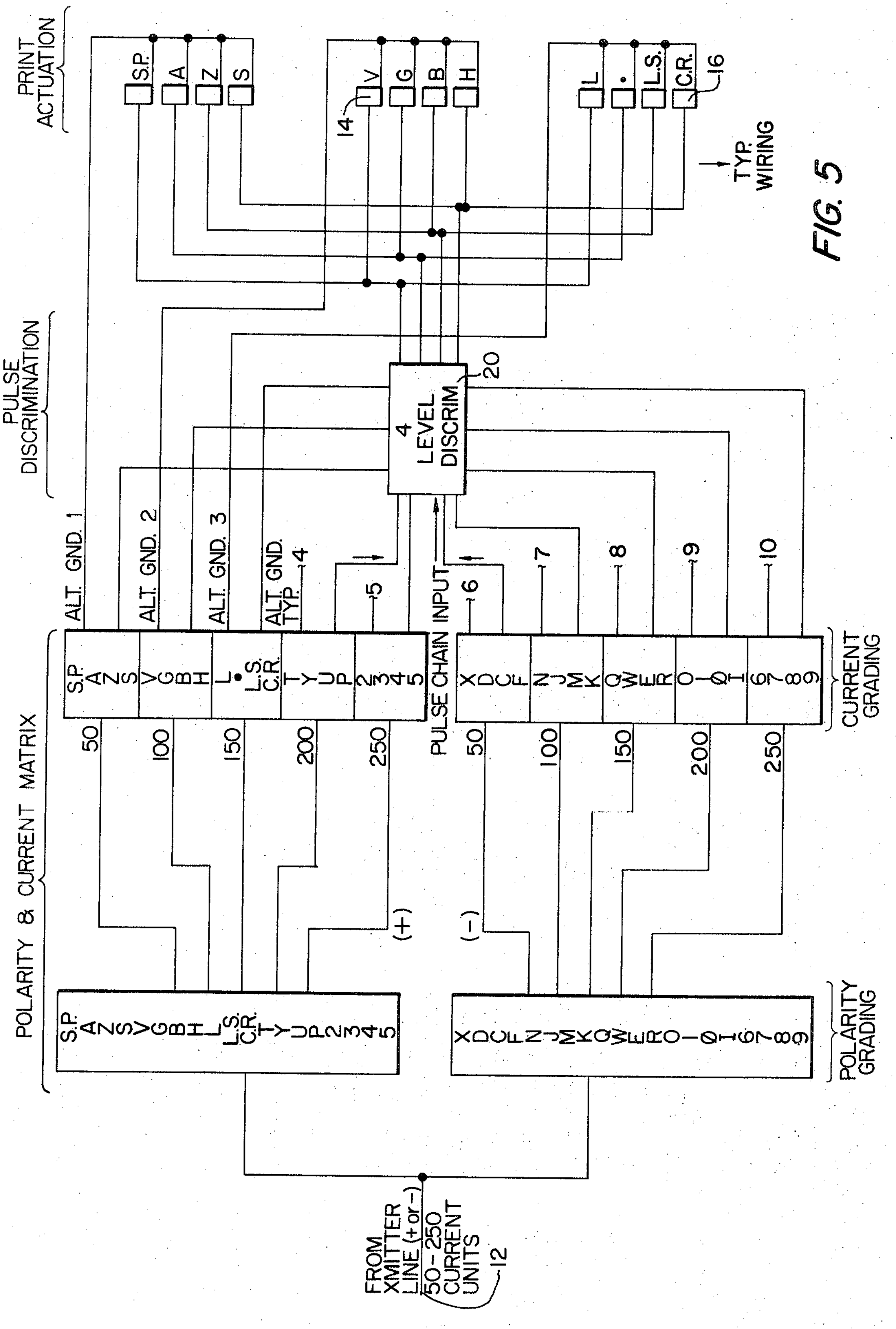
FIG. 5 is a diagrammatic schematic of the receiver unit associated with each typewriter.
Figure 6:
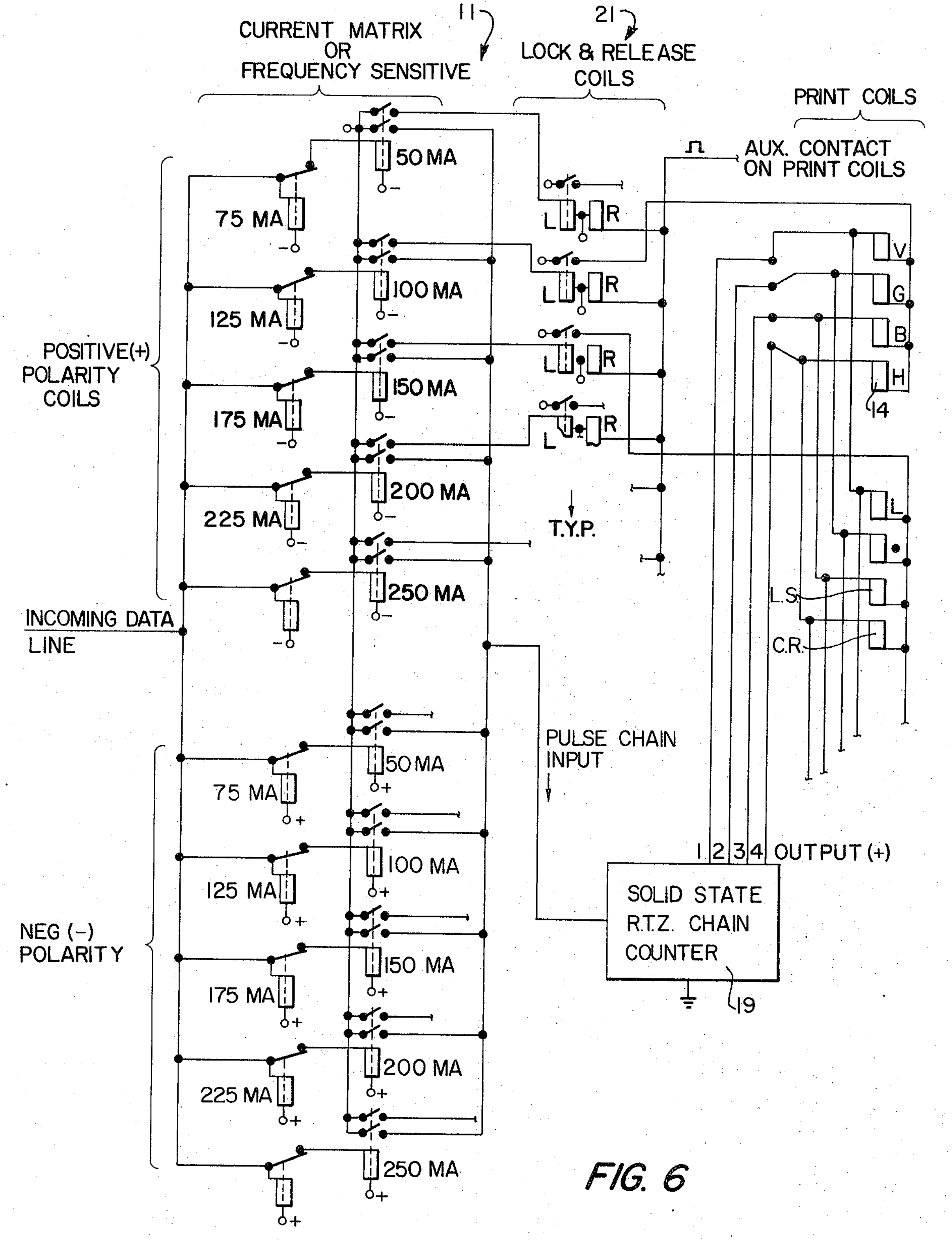
FIG. 6 is a schematic of the four level pulse discriminator shown in FIG. 5.

Concurrently with incoming data being graded as to polarity and current or frequency levels, FIG. 5, the data is passed through an additional sub-assembly, a four-level discriminator matrix 20 where the pulse format is graded. The total incoming data format, FIGS. 5 and 6, is graded as to polarity, current or frequency and the pulse format is then directed to another matrix 21 where electrical means responsive to the individual coded characters activate the printing mechanism 16 which is part of the electromechanical typewriter.

Figure 7:
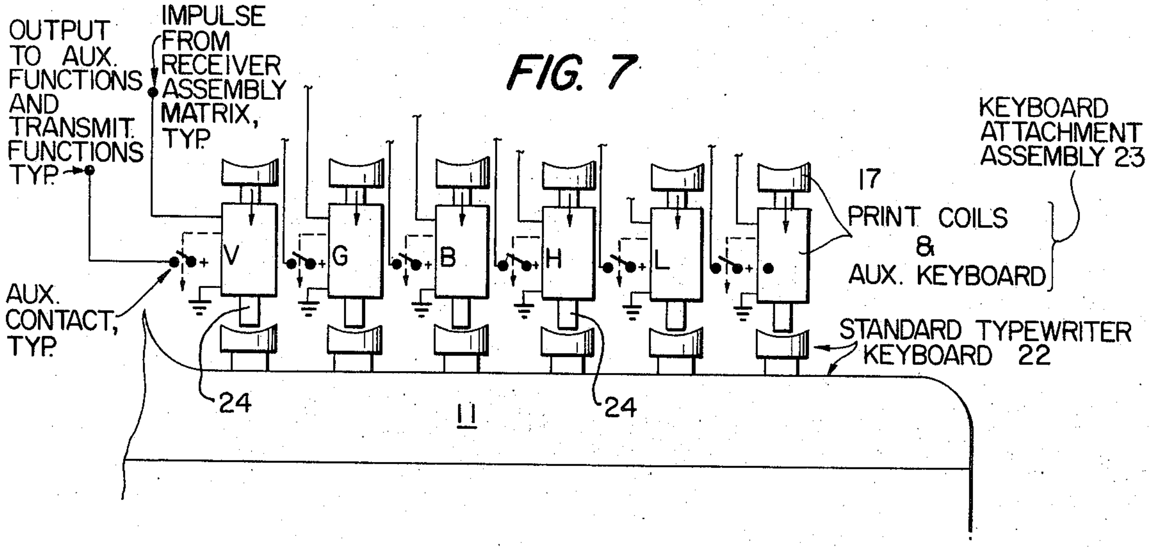
FIG. 7 is a mechanical schematic of the typewriter keyboard to electrical impulse conversion and electrical impulse to keyboard actuation conversion for use in adapting electromechanical typewriters to the system of the present invention.

Referring now to FIG. 7, one of the units 11 is shown as having the standard keyboard 22 with an auxiliary keyboard attachment 23 positioned over the typewriter keys. The auxiliary attachment is actuated by print coils 17 which receive their pulse from the receiver assembly matrix to cause the cores 24 to actuate the typewriter keys in a manner known to this art.

In operation it is seen that the sequence of events in the transmitting, receiving and printing of such encoded intelligence are, selection of character, the generation of an electrical impulse upon such a selection, the impression on the electrical conductor linking the transmitter unit with the receiver unit with the particular and discreet polarity, current or frequency level and impulse sequence corresponding to the selected character, and the serial transmission of this encoded data. The reception of such data at the receiving unit 11 is concurrently screened and graded as to polarity, current or frequency level and pulse format, then serially fed into selective means for activating the receiver printing mechanism.

The above operational principles and sequences of events are illustrated are seen to be a one-way operation; however two-way operation is attained by equipping transmitter units with receiving equipping the means and capability and receiving units with transmitting means and capability.

Referring now to the coding format to be employed, it is seen that an Alpha-Numerical as well as basic machine function capability is presented. The total capability is served by employing but four distinct combinations of pulses. To expand the mathematical capability of but four pulses, predetermined units and characters are assigned positive or negative polarities. Further extension of this mathematical expansion is to assign groups of units and characters discreet current or frequency levels. For purposes of defining "current" as examples of workable media, this shall be interpreted as encompassing currents related to electrical flow and also frequency. However, for purposes of this description, electrical current levels are divided and presented as differentials of 50 units of current for each of five groups of characters.

The encoding format is shown in FIG. 1. The practice of determining the current (electrical or frequency) level differentials shall be within keeping of present day technology in performing the electrical function of sensing and differentially responding to such current or frequency levels.

What is claimed is:

1. A communication system comprising a transmitting typewriter of the electromechanical type and a receiving typewriter of the electromechanical type, conductive link means interconnecting said transmitting and receiving typewriters, means responsive to the depression of each key on the keyboard of the transmitting typewriter to initiate an electrical impulse; a switching matrix in circuit with each of said transmitting and receiving typewriters and having a plurality of units, each being responsive to only one character initiated by the keyboard of the transmitting typewriter and received by the receiving typewriter, means in said matrix, selectively in circuit with said electrically conductive means between said transmitting and receiving typewriters, for impressing upon and decoding from the conductive line the appropriate polarity, current or frequency level of a pulse format representative of the character selected to be transmitted by the transmitting typewriter and received by the receiving typewriter to cause print out of a message at the receiving typewriter transmitted from the transmitting typewriter.

2. A communication system as claimed in claim 1, wherein the pulse format, being received by the receiving typewriter, is passed through a discriminator matrix where the pulse is graded as to polarity, current or frequency level and thence directed to said switching matrix where electrical means, responsive to the individual characters, actuate the receiving typewriter's print out mechanism to print out the message transmitted from the transmitting typewriter.

3. A communication system as claimed in claim 2 wherein said pulse format of said transmitting typewriter leaving said switching matrix, is subjected to a re-cycling chain counter prior to being placed in circuit with the receiving typewriter.

4. A communication system as claimed in claim 3 wherein said re-cycling chain counter has a return to zero function.

5. The method of communicating in a communication system having a transmitting and receiving electromechanical typewriter in which encoded intelligence is transmitted by the transmitting typewriter and received and decoded and printed by the receiving typewriter over a conductor linking same; comprising, generating an electrical impulse upon selection of characters on the transmitting typewriter said impulse having a discreet polarity, current or frequency level representative of only the selected character, impressing said impulse on the conductor linking said transmitting typewriter to said receiving typewriter, receiving the transmitted pulse at the receiving typewriter and decoding by screening and grading the pulse as to polarity, current or frequency and pulse format, and activating the receiving typewriter to print out the decoded message at the receiving typewriter.

* * * * *